United States Patent [19]
Rubinshtein

[11] Patent Number: 4,874,121
[45] Date of Patent: Oct. 17, 1989

[54] WEB FEED TRACTOR BELT ASSEMBLY

[75] Inventor: Bernard Rubinshtein, Spokane, Wash.

[73] Assignee: Output Technology Corporation, Spokane, Wash.

[21] Appl. No.: 189,521

[22] Filed: May 3, 1988

[51] Int. Cl.[4] .......... G03B 1/30
[52] U.S. Cl. .......... 226/74; 226/75; 226/87
[58] Field of Search .......... 226/74, 75, 87

[56] References Cited

U.S. PATENT DOCUMENTS

| | | | |
|---|---|---|---|
| 3,113,823 | 12/1963 | Phillips | 226/75 X |
| 3,825,162 | 7/1974 | Hubbard | 226/74 |
| 3,938,721 | 2/1976 | Staneck et al. | 226/75 |
| 4,130,230 | 12/1978 | Seitz | 226/75 |
| 4,453,660 | 7/1984 | Cornell et al. | 226/87 X |
| 4,473,179 | 9/1984 | Bauer | 226/74 |
| 4,611,737 | 9/1986 | Hubbard et al. | 226/74 |

OTHER PUBLICATIONS

D. W. Reed, Strip Feed Mechanism, 9-1963.

*Primary Examiner*—Stanley N. Gilreath
*Assistant Examiner*—Phillip Han
*Attorney, Agent, or Firm*—Wells, St. John & Roberts

[57] ABSTRACT

A web feed tractor mechanism 10 is illustrated in the drawings for moving a web material in a longitudinal direction in which the web material has perforations along edge sections 16 and 18 for enabling precision movement of the web particularly for use in computer output printing. The web tractor mechanism has two parallel tractors 34 and 36 that support and drive tractor drive belts 54 and 56. The belts 54 and 56 have drive pins 70 and 72 respectively for engaging the perforations along the opposite side edge section 16 and 18. Preferably the pins 70 have a reduced cross-section that is both longitudinally and laterally symmetrical, with lateral and longitudinal dimensions that are substantially equal. The surfaces of the pins 70 engage the inside edge of the perforations and drive the web forward while preventing lateral movement of the edge section 16 to provide lateral stability. The pins 72 have a reduced cross-section in the lateral direction to accommodate misalignments and inaccuracies in the lateral direction of the pins and/or perforations to accurately and rapidly move the web in the logitudinal direction. This feature improves the accuracy and quality of the printing.

14 Claims, 3 Drawing Sheets

FIG. 2
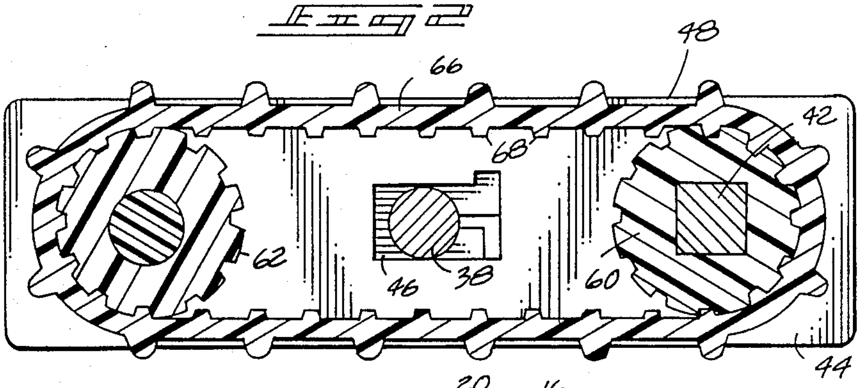
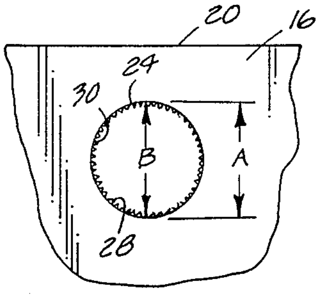
FIG. 3
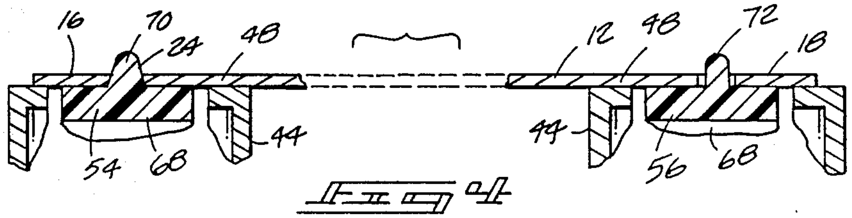
FIG. 4
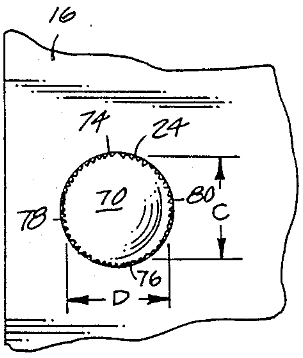
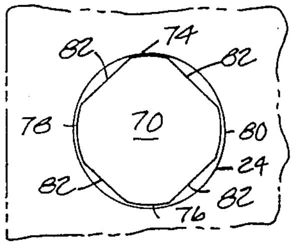
FIG. 6
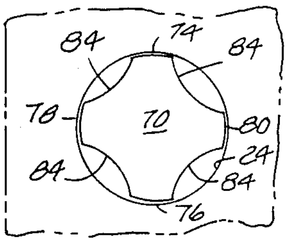
FIG. 5
FIG. 7

WEB FEED TRACTOR BELT ASSEMBLY

TECHNICAL FIELD

This invention relates to web feed tractor belt assembly of the type which is useful in feeding perforated webs and particulary edge perforated paper such as continuous folded computer paper.

BACKGROUND OF THE INVENTION

The present invention is particularly suitable for use in web feed tractors which feed webs at high speed and at high acceleration forces, so as to present successive lines or portions of lines for printing of characters or graphic displays by computer printers. Features of this invention may also be useful whenever feeding is accomplished by entry of one element into another so as to provide driving engagement therebetween.

Generally such tractors includes an endless belt entrained in a loop over sprocket wheels in which at least one of the sprocket wheels is driven by a drive shaft connected to equipment such as a printer on which the tractor is mounted. The belt typically has pins of round cross-section (at least at their bases), projecting from the belt to engage the perforation provided in the web to drive the web material along a linear path. The belt is normally trained over supports such as sprockets to curve away from the linear path and then return along the loop back to the linear path. Such tractors are normally employed in pairs at opposite edges of the web to drive the web along the side edges. Almost invariably the tractors are mounted parallel to each other and are drive by a common drive shaft that extends therebetween. One of the more serious problems associated with such prior art tractor device is the inaccuracy of positioning of the perforations in the web material relative to the centers of the tractor pins. This inaccuracy is usually the result of several factors: (1) inaccuracies of lateral positioning of the pins on the tractor belts; (2) inaccuracies in the alignment of the perforations in the web; (3) tolerance error in the alignment of the two tractors parallel with each other in the direction of the feed; and (4) longitudinal phase error between the pins of the two tractors to cause the lateral distance between the side perforations to vary along the length of the web material. These inaccuracies have an adverse affect on the feeding of the web material in both the transverse direction and the linear direction of the web feed.

The perforations in the paper web generally have a circular shape with a multitude of notches or serrated edge to provide a feathering engagement with the circumference of the pins. However there is generally no provision for compensation for unavoidable inaccuracies that have been previously described. The pair of tractor pins are constantly fighting for control of the paper that comes into engagement with the perforations. This leads to a jerking of the paper from one side to another which causes loss of accuracy of printing of the characters on the paper and ultimately deterioration of the print quality. It also contributes to increased level of noise produced by such devices in addition to excess wear.

Examples of typical types of tractor drives and belts are illustrated in Leo J. Hubbard; U.S. Pat. No. 3,825,162 granted July 23, 1974; Alan F. Seitz; U.S. Pat. No. 4,130,230 granted December 19, 1978 and John D. Hubbard et al U.S. Pat. No. 4,611,737 granted September 16, 1986.

The latter U.S. Pat. No. 4,611,737 provides for a mechanism for attempting to locate the perforations of the web on the belt pins as rapidly as possible so as to minimize (1) stretching of the front or rear of the perforations, (2) deformation of the perforations and (3) tearing of the perforations. To accomplish this, a shoulder on the outside of one of the lids is provided to cause the paper to ride further down on the pin than normal. Additionally the shoulder is provided with a much closer tolerance to the pin. In FIGS. 6, 7, and 7A of the patent, the pins on one belt have a flat vertical surface formed on a side surface to enable the shoulder of the lid to encroach more closely to the base of the pin. The flat side surface forms an arcuate segment of an arcuate distance of between 60° to 90° as illustrated by angle $\beta$ in FIG. 7. Such an arrangement increases wear between the lid and the pins and further increases the noise caused by temporary contact between the lid and the pins.

An additional effort has been made to increase the number of pins that are continuously in engagement with the web from 4–5 to 6–8 or more pins. Although this has provided some improvement due to a better averaging of the errors, it is not a complete solution and it is more costly because of the relatively large increase in the size and cost of the tractors.

Additionally in the past some accommodation has been made for misalignment by the use of paper in which the holes or perforations along one edge are circular in cross-section while the holes or perforations along the other edge are oval in shape. An example is illustrated in the Phillips U.S. Pat. No. 3,113,823 granted Decembrer 10, 1963. However such provision is generally limited to rather expensive papers that are used for charts. Generally cutting such perforations in the paper requires additional costs in perforating the paper with two different sets of apertures and further requires additional increase in inventory stocking of papers. It would cost the computer paper industry vast sums to convert to accommodate problems generally caused by the feed mechanism.

It is an object of this invention to overcome may of the shortcomings of the prior art by providing a novel tractor construction and a novel belt for driving the web material, including a pair of tractors which provide means for compensating for unavoidable inaccuracies that are difficult to overcome without having to utilize special paper.

BRIEF DESCRIPTION OF THE DRAWINGS

A preferred and alternate embodiment of this invention is illustrated in the accompanying drawings, in which:

FIG. 2 is a vertical cross-sectional view taken along lines 2—2 in FIG. 1 illustrating internal details of one of the tractors illustrating the mounting of a belt on a tractor drive mechanism;

FIG. 3 is a enlarged fragmentary plan view of one edge of the perforated web illustrating one of the perforations in which the perforation has a serrated internal edge;

FIG. 4 is a vertical transverse cross-sectional view in diagrammatical form, illustrating the web supported between the two tractors with belts of the two tractors having pins projecting into edge perforations in the web;

FIG. 5 is an isolated plan view of a lefthand side of the web material illustrating a drive pin projecting into the perforation;

FIG. 6 is a fragmentary enlarged view similar to FIG. 5 showing an alternative embodiment of the pins of the lefthand drive belt in which the pins have inclined corner surfaces between the front, rear and side surfaces;

FIG. 7 is a fragmentary enlarged view similar to FIG. 6 except showing the front, rear and side surfaces having a curved corner recesses therebetween to reduce the mass of the pin;

DETAILED DESCRIPTION OF THE PREFERRED AND ALTERNATE EMBODIMENTS

The following disclosure of the invention is submitted in compliance with the constitutional purpose of the Patent Laws "to promote the progress of science and useful arts" (Article 1, Section 8).

Figure 1:
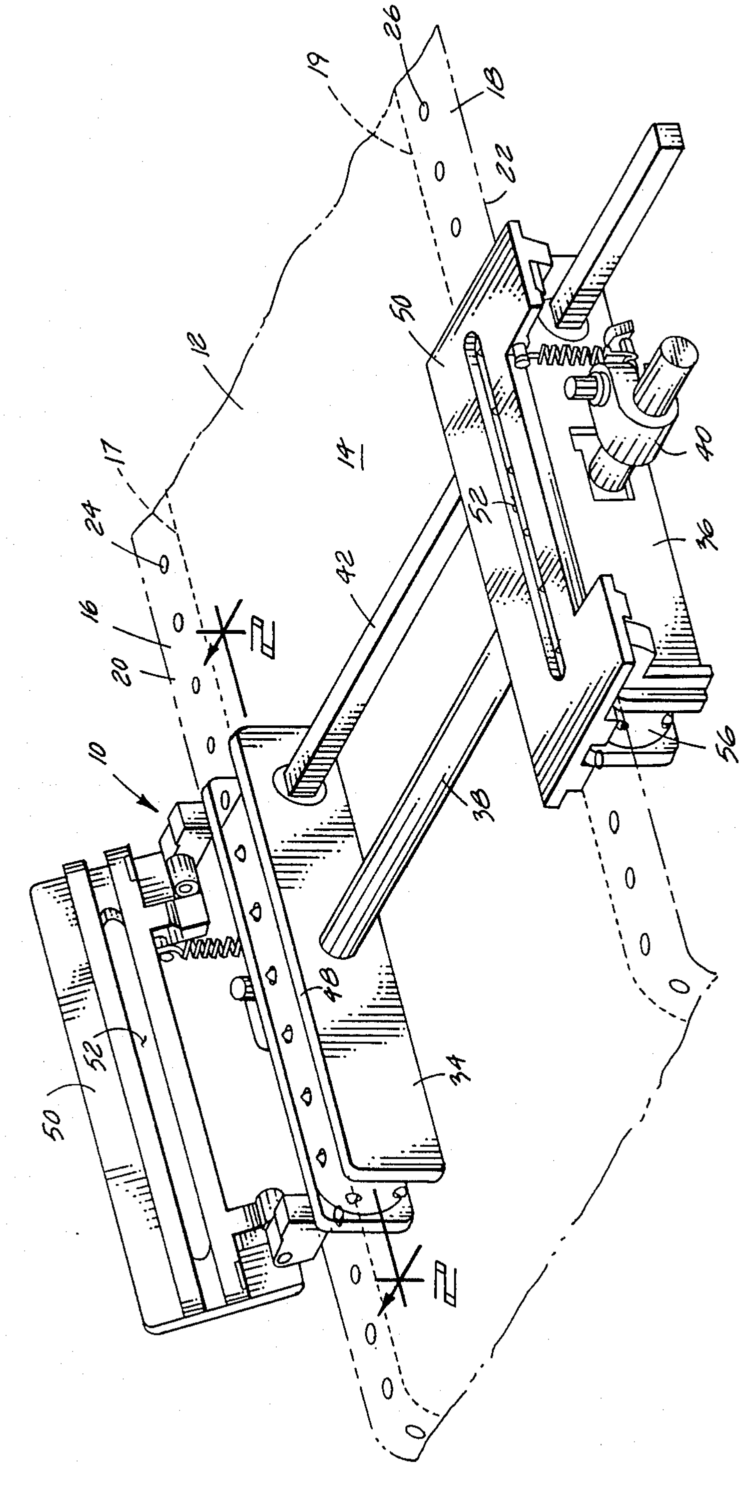
FIG. 1 is a perspective view of a tractor mechanism feeding a web material having perforations along the side edges in which one of the tractors has a lid in an open position to illustrate the engagement of belt pins with the perforations along the one side of the tractor mechanism.

Illustrated in FIG. 1 is a web feed tractor mechanism generally designated with the numeral 10 for feeding a web material 12 in a linear longitudinal direction. The web material 12 is preferably a continuous, folded, computer paper in which the feeding mechanism must be very accurate and very efficient, Additionally the tractor mechanism 10 must be fed in very rapid increments to provide high quality, legible printing.

The web 12 has a central or main body 14 with side sections 16 and 18 along opposite side edges 20 and 22 respectively. Each side section 16, 18 is easily separable along tear or separation lines 17 and 19 respectively. Separation if necessary usually occurs after the document is printed.

The left edge section 16 has a row of circular drive perforations 24. The right edge section 18 has a row of circular perforations 26. The perforations 24 and 26 have the same or substantially the same diameters. Each of the perforations 24, 26 have circular inside edges 28. In the preferred embodiment illustrated in FIG. 3, the web material 12 has perforations in which the circular inside edges 28 have serrations or teeth 30. FIG. 3 illustrates a single perforation 24, 26 in which the maximum inside diameter "A" extends across the perforation to the bases of the serrations. A minimum inside diameter "B" is provided across the perforation between the tips of the serrations. For most computer papers, the inside diameter B is approximately 0.150 inches and the maximum diameter A is 0.165 inches. Generally the serrations 30 provide a feathering effect to facilitate the penetration of the drive pins.

Returning to FIG. 1, the web feed tractor mechanism 10 includes two tractors designated with the numerals 34 for a righthand tractor and 36 for a lefthand tractor respectively. The two tractors are mounted parallel to each other along the edges 20 and 22 of the web material. The tractors 34, 36 are supported by support bar or rod 38 that extends therebetween. A lateral adjustment feature 40 is provided to enable the lateral distance between the tractors 34 and 36 to be adjusted to accommodate different width paper and to provide alignment adjustment between the tractors and to clamp both tractors in the adjusted position. Additionally a common drive shaft 42 extends between the two tractors and is operatively connected to a drive mechanism (not shown), usually a printer system, for driving the tractors in synchronization with the printer system. In FIG. 1, the drive shaft 42 is illustrated having a square cross-section.

Each of the tractors 34, 36 have a frame 44 as illustrated in FIG. 2 with a support bearing 46 for engaging and gripping the support rod 38. Additionally each of the frames 44 have a web support surface 48 as illustrated most particularly in FIG. 4 for supporting the web material.

Each of the tractors 34, 36 include a hinged guide plate 50 mounted thereon that swings down over the edge sections 16, 18 of the web for guiding the web through the tractor and for maintaining the web in substantial engagement with the web support surface 48. Each of the hinged guide plates 50 include a longitudinal slot 52.

The tractor 34 includes a lefthand drive belt 54 and tractor 36 includes a righthand drive belt 56. Each of the belts 54 and 56 have a belt support and drive means which includes a drive sprocket or roller 60 (FIG. 2)

preferably mounted at a forward position on the tractor frame 44 for engaging and driving an upper flight of the drive belts 54, 56 in a forward direction. An idler sprocket 62 is generally mounted at a rear portion on the frame 44 for supporting the drive belts 54 and 56 as illustrated in FIG. 2. It is not believed that the belt support and drive means is particularly unique and it will not be discussed in any specific detail.

Each of the continuous drive belts 54, 56 includes a belt body 66 which is made of a semi-flexible strip material such as rubber, plastic or metal. Preferably the belt body 66 includes drive lugs or teeth 68 on an inside surface thereof being engaged by the drive and idler sprockets 60 and 62.

The drive belt 54, for purposes of description, will be referred to as the lefthand drive belt and the drive belt 56 will be referred to as the righthand drive belt; however it should be understood that the terms are arbitrary and they could be easily reversed. The lefthand drive belt 54 includes a first set of pins 70 and the righthand drive belt 56 includes a second set of pins 72. FIGS. 5, 6 and 7 shown preferred and alternate embodiments of the pins 70 and FIGS. 8–17 shown preferred and alternate embodiments of the pins 72.

Each of the lefthand pins 70 has a radial and bilateral symmetry in cross-section at its base. As illustrated in FIG. 5, the pin 70 has a circular cross-section with a front surface 74 and a rear surface 76 interconnected through curved side surfaces 78 and 80. Preferably the longitudinal dimension or diameter "C" between the front surface and the rear surface is identical or equal to the lateral dimension or diameter "D" between the side surfaces 78 and 80. In this manner the lefthand pin 70 uniformly engages the inside edge 28 of the perforations 24 for driving the web in the longitudinal direction and for stabilizing the web in the lateral direction to prevent lateral movement of the engaged edge section 16 relative to the drive belt 54.

Preferred embodiments of the cross-section configuration of the lefthand pins 70 are illustrated in FIGS. 6 and 7. FIG. 6 shows flat corner surfaces 82 being inclined at an angle of approximately 45° to both the longitudinal and transverse axis of the pin 70. This enables the pin 70 to be manufactured with a reduced cross-section to reduce frictional contact and thereby to facilitate ability of the pins 70 to rapidly penetrate into the perforations. Additionally the reduced cross-section reduces the weight of the belt and its momentum. However, it should be noted that the longitudinal dimension "C" and the lateral dimension "D" still remain the same with the front surface 74 and the rear surface 76 remaining in contact with the inside edge 28 of the perforations in the longitudinal directions and the side surfaces 78 and 80 remain in contact with the inside circular edge 28 in the lateral direction to provide both the longitudinal and lateral stability and provide sufficient contact to enable the pins 70 to drive the paper forward in the longitudinal direction without undue stress to the inside surface edge 28.

The embodiment illustrated in FIG. 7 of the pin 70 is somewhat similar to that shown in FIG. 6 except that the flat surfaces 82 are replaced with concave surfaces 84 to further reduce the mass of the pins 70 while still retaining all of the previous mentioned advantages.

In contrast to the pins 70, the pins 72 (FIGS. 8–17) each have a reduced horizontal cross-section in which the diametrical dimension in the lateral direction "F" is less than the diametrical dimension in the longitudinal direction "E" so as to provide one or more lateral gaps between the pins and the inside edge 28 in the lateral direction to permit edge section 18 to move laterally to adjust for misalignment and differences in lateral distance between the perforations 24, 26 from one edge section 16 to the other edge section 18. This eliminates uneven lateral tensioning of the main body 14 of the web 12. Such a feature overcomes slight inaccuracies between the mounting of the belts 54, 56 in truly parallel relationships and additionally overcomes many inaccuracies of the positioning of the pins on the belts in the longitudinal direction.

More specifically, each of the righthand pins 72 have a front surface 86 that extends in an arcual direction of generally less than 90° for engaging the inside edge 28 in the lateral direction. Likewise, each of the pins 72 have a rear surface 88 that has an arcual dimension of less than 90° for engaging a rear section or portion of the inside edge 28. The longitudinal dimension "E" between the front surface 86 and the rear surface 88 is substantially equal to the diameter of the perforations and substantially equal to the dimension "C" and "D"of the pins 70.

The pins 72 further include side surfaces 90 and 92 that extend from the front surface 86 to the rear surface 88. Each of the side surfaces 90, 92 has an arcual dimension greater than 90° in which the maximum lateral distance "F" between the side surfaces 90, 92 is less than the longitudinal dimension "E" so that lateral gaps 94 and 96 are formed between the side surfaces 90 and 92 and the adjacent portions of the side edge 28 of the perforation 26 respectively. It should be noted that the arcuate dimensions of the lateral gaps 94 and 96 are measured with respect to the center of the perforation 26 and extend in arcuate dimensions of more than 90° so as to accommodate misalignments and inaccuracies of the perforations and the pins to prevent shifting of the web as the web is being driven forward.

Figure 8:
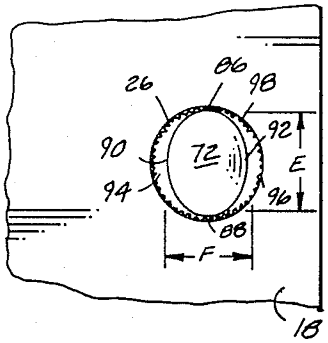
FIG. 8 is a plan view showing a pin of the righthand drive belt in which the pin has a reduced, oval shaped, cross-section engaging only a front and rear portion of the perforation.

FIGS. 9 through 17 illustrate a variety of alternate embodiments of the pins 72. The preferred embodiment is illustrated in FIG. 8, in which each of the pins 72 have an elliptical cross-section 98 in which the major dimension "E" of the ellipse extends from the front surface 86 to the rear surface 88 and is substantially equal to the diameter of the perforation. The minor dimension "F" of the ellipse extending between the side surfaces 90 and 92 is considerably less than the major dimension "E" forming the lateral gaps 94 and 96 on both sides of the pin 72 to accommodate lateral inaccuracies or misalignments of the pins and the perforations.

Figure 9:
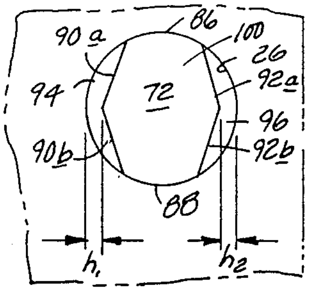
FIG. 9 is a fragmentary plan view similar to FIG. 8 except showing an alternate embodiment of the righthand drive belt in which the drive pins have reduced diamond-shaped cross-sections.

The embodiment illustrated in FIG. 9 shows a somewhat diamond shaped cross-section 100 having side surface sections 90(*a*) and 90(*b*) and side surface sections 92(*a*) and 92(*b*). The maximum dimension "F" at a apex of the diamond between the side surfaces 90 and 92 is less than the longitudinal dimension "F". The side surfaces 90 and 92 form the lateral gaps 94 and 96 on each side of the pin 72 having equal lateral widths of "$h_1$" and "$h_2$" respectively.

Figure 10:
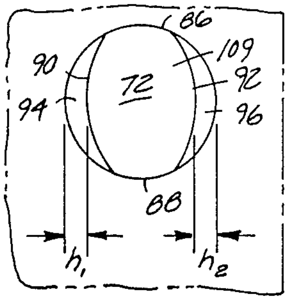
FIG. 10 is a fragmentary plan view similar to FIG. 8 except showing an alternate embodiment in which each pin of the righthand drive belt has a reduced cross-section with curved side surfaces.

The embodiment illustrated in FIG. 10 shows a somewhat oblong cross-section 109 having a curved front surface 86 of an arcuate dimension of less than 90° and a rear surface 88 also having an arcuate dimension of less than 90° . Curved side surfaces 90 and 92 have a radius of curvature greater than the radius of curvature of the perforation 26 with the cross-section 102 being laterally symmetrical. Lateral gaps 94 and 96 are formed on both sides of the pin 102 having equal lateral dimensions "$h_1$" and "$h_2$" respectively.

Figure 11:
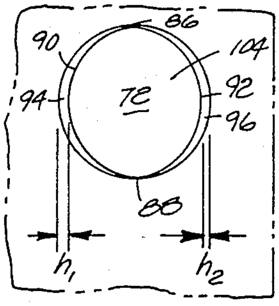
FIG. 11 is a plan view similar to FIG. 8 except showing a additional embodiment in which each pin of the righthand drive belt has a reduced offset cross-section with curved side surfaces.

In FIG. 11, the pin 72 is formed with an offset elliptical cross-section 104 that is similar to the cross-section illustrated in FIG. 8 except the ellipse is offset from the center of the circle so that the lateral gap 94 is slightly wider than the lateral gap 96 to provide a differential ability of moving laterally. The inward lateral movement is restricted to a greater extent than the outer lateral movement of the edge section 18. The lateral distance "$h_1$" is greater than the lateral distance "$h_2$".

Figure 12:
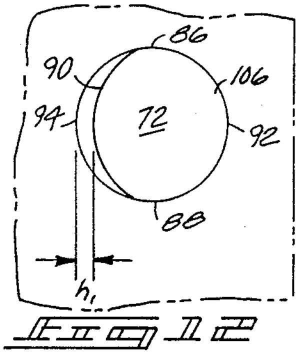
FIG. 12 is a fragmentary enlarged view similar to FIG. 8 except showing a further alternate embodiment in which the reduced cross-section of each pin of the righthand drive belt is moon shaped with a gap on the left side.
Figure 13:
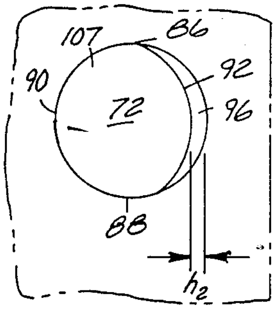
FIG. 13 is a fragmentary enlarged plan view similar to FIG. 8 except showing a further alternate embodiment in which the reduced cross-section of each pin of the righthand drive belt is moon shaped with a gap on the right side.

The embodiments illustrated in FIGS. 12 and 13 provide for what is called partial moon cross-sections 106 and 107 respectively. In FIG. 12, the partial moon cross-section 106 has a continuous circular front surface 86, side surface 92 and rear surface 88. The side surface 90 has a larger radius of curvature providing the lateral gap 94 ($h_1$). There is not a corresponding lateral gap 96 as side surface 92 engages the corresponding portion of the edge 28 of the perforation.

The embodiment illustrated in FIG. 13 is just the reverse having a partial moon shaped cross-section 107 in which the front, rear, and side surfaces 86, 88, and 90 have the same radius of curvature. The side surface 92 has a larger radius of curvature forming a lateral gap 96 ($h_2$). In this configuration there is no lateral gap 94. In FIG. 12, the lateral movement is confined principally to outward lateral movement, whereas in FIG. 13 lateral movement is confined principally to inward lateral movement.

Figure 14:
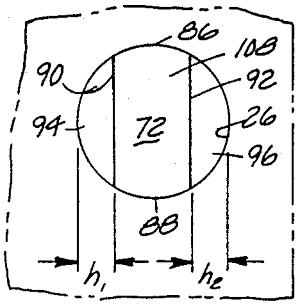
FIG. 14 is an enlarged fragmentary plan view similar to FIG. 8 except showing a further alternate embodiment in which the reduced cross-section of each pin of the right drive belt has flat side surfaces that are laterally symmetrical.

In FIG. 14 pin 72 is illustrated with a lateral symmetrical cross-section 108 in which the front surface and rear surfaces 86 and 88 are curved and the side surfaces 90 and 92 are flat and parallel providing arcuate segment lateral gaps 94 and 96.

Figure 15:
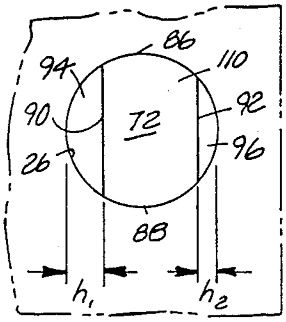
FIG. 15 is fragmentary enlarged view similar to FIG. 8 except showing a further alternative embodiment in which the reduced cross-section of each pin of the righthand drive belt has offset parallel flat side surfaces.

The embodiment illustrated in FIG. 15 is somewhat similar to that shown in FIG. 14 however the cross-section 110 is offset in which the arcuate distance of the flat side surface 90 is greater than the arcuate distance of the flat side surface 92 so that the lateral gap 94 is wider than the lateral gap 96. Lateral distance $h_1$ is greater than lateral distance $h_2$. Alternatively the cross-section 110 may be offset in the opposite direction with $h_1$ being less that $h_2$.

Figure 16:
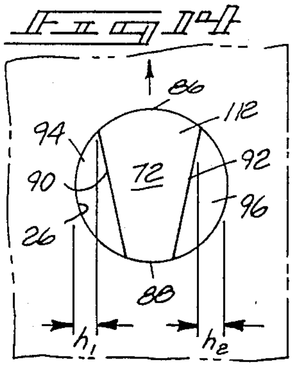
FIG. 16 is a view similar to FIG. 8 except showing a further alternate embodiment of the right side belt with each pin having side surfaces that are inclined from front to back.

The pin 72 illustrated in FIG. 16 has what is called an inclined flat laterally symmetrical cross-section 112 in which flat side surfaces 90 and 92 are inclined inward from the front surface 86 to the rear surface 88 with the front surface 86 having a larger arcuate dimension than the rear surface 88. In any event, the arcuate dimension of the front surface 86 is less than 90°. The arcuate distances of the side surfaces 90 and 92 are greater than 90°. The side surfaces 90 and 92 form the lateral gaps 94 and 96 with equal lateral width $h_1$ and $h_2$. The preferred feed direction for this embodiment is indicated by the arrow shown in FIG. 16.

Figure 17:
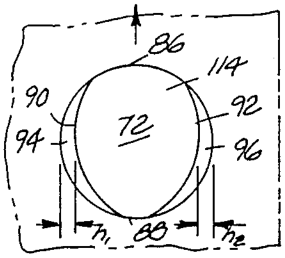
FIG. 17 is similar to FIG. 8 except showing an alternate embodiment of the pins of the righthand side drive having side surfaces that are curved in which the radius of curvature is offset forward of the center of the perforation.

In the last alternate embodiment, illustrated in FIG. 17, the pin 72 has a lobe or offset arc cross-section 114 in which the arcuate distance of the front surface 86 is greater than the arcuate distance of the rear surface 88 and that the radius of curvature of side surfaces 90 and 92 are greater than the radius of curvature of the perforation 26 with the center of the radius of curvatures being forward of the lateral axis of the perforation. Lateral gaps 94 and 96 are formed between the arcuate side surfaces 90 and 92 as illustrated in FIG. 17. The preferred feed direction for this embodiment is indicated by the arrow shown in FIG. 17.

As illustrated in the preferred and alternate embodiments, the lateral dimension "F" between the side surfaces 90 and 92 of pin 72 is less than the longitudinal major dimension "E" between the front surface 86 and the rear surface 88 to accommodate misalignments and inaccuracies in the lateral direction without sacrificing the ability of the tractor mechanism to accurately and rapidly move the web in the longitudinal direction.

In a preferred embodiment, the major dimensions "C" and "E" of both the pins 70 and 72 is at least equal to the minimum inside diameter of "B" of the perforations and preferably is between the minimum inside diameter of "B" and the maximum inside diameter of "A". However the major dimensions "C" and "E" may be slightly less than the dimension of "B" of the perforation in many instances.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A web feed tractor mechanism for feeding a web in a longitudinal path in which the web has circular feed perforations of a prescribed inside diameter formed in parallel edge sections along the side edges of the web, comprising:

a pair of edge drive belts having drive pins thereon adapted to project into the feed perforations in which one of the drive belts has a first set of projecting pins and the other drive belt has a second set of projecting pins;

drive means for supporting the edge drive belts substantially parallel with each other along corresponding edge sections of the web and for synchronously driving the belts to move the drive pins into the perforations and to move the web forward in the longitudinal direction;

wherein each of the first set of pins of one of the belts has a tapered front surface, a tapered rear surface, a tapered left side surface and a tapered right side surface extending outward from a base of the first pin, in which the diametrical distances between the front and rear surfaces and the left side and right side surfaces at the base are substantially equal the prescribed inside diameter of the feed perforations for driving the web in the longitudinal direction and stabilizing the web in the lateral direction to prevent lateral movement of the engaged edge section relative to the one belt;

wherein each of the second set of pins of the other belt have a reduced cross-section at its base with a tapered front surface, a tapered rear surface, a tapered left side surface and a tapered right side surface in which the diametrical distance between the front and rear surfaces at their bases substantially equals the prescribed inside diameter of the perforations to engage the inside edge of the perforation for driving the web in the longitudinal direction and wherein the diametrical distance between the left side surface and the right side surface at their bases is substantially less than the prescribed inside diameter of the perforations to form a lateral gap between at least one of the side surfaces and the inside edge of the perforations to accommodate laterally misalignments and inaccuracies to minimize lateral tension on the web.

2. The web feed tractor as defined in claim 1 wherein each of the side surfaces forming the lateral gap extends at its base in an arcuate distance of greater than 90° about a pin axis.

3. The web feed tractor as defined in claim 1 wherein the lateral gap between at least one of the side surfaces of the reduced cross-section pin at its base and the inside edge of the perforation extends in an arcuate distance of greater than 90° about a center axis of the perforation.

4. The web feed tractor as defined in claim 1 wherein the diametrical distance between the pin side surfaces of the second set of pins at their bases is substantially less than the prescribed inside diameter of the circular perforations to form lateral gaps between both side surfaces and the inside edge of the perforations.

5. The web feed tractor as defined in claim 4 wherein the laterally reduced cross-section pins at their bases are laterally symmetrical with respect to a longitudinal plane with a major diametrical distance substantially equal to the inside diameter of circular perforations and a minor diametrical distance between the side surfaces substantially less than major diametrical distance forming the lateral gaps between the side surfaces and the inside edge of the perforations.

6. The web feed tractor as defined in claim 1 wherein each of the reduced cross-section pins at their bases are oval in cross-section having a major diametrical dimension between the front and rear surfaces and a minor diametrical dimension between the side surfaces.

7. The web feed tractor as defined in claim 6 wherein each of the reduced cross-section pins at their bases are elliptical in cross-section having a major diametrical dimension between the front and rear surfaces and a minor diametrical dimension between the side surfaces.

8. The web feed tractor as defined in claim 1 wherein one side surface at the base of each of the reduced cross-section pins is curved forming a progressively decreasing gap between the side surface and the inside of the perforation as the side surface extends toward both the front surface and the rear surface.

9. The web feed tractor as defined in claim 1 wherein the front surface at the base of each of the reduced cross-section pins engages the inside edge of the perforation along an arcuate angle of less than 90° with respect to the center axis of the perforation.

10. The web feed tractor as defined in claim 9 wherein the rear surface at the base of each of the reduced cross-section pins engages the inside edge of the perforation along an arcuate angle of less than 90° with respect to the center of the perforation.

11. The web feed tractor as defined in claim 1 wherein each of the reduced cross-section pins at their bases engage the inside of the perforation along the front and rear surfaces for a combined engagement arcuate dimension of less than 180° about the center of the perforation.

12. A tractor drive belt of engaging and moving a web in a longitudinal direction in which the web has circular feed perforations of a prescribed diameter and prescribed circular cross-section, along at least one edge section of the web, comprising:

a continuous belt body adapted to have a flight thereof driven in the longitudinal path;

a plurality of evenly spaced tapered drive pins, each extending outward from a base at the belt body for projecting into the feed perforations and moving the web in the longitudinal path as the body is driven;

wherein each of the drive pins has an arcuate front surface, a rear surface, a non-circular left side surface and a non-circular right side surface with an elongated cross-section at the base that is less than the prescribed circular cross-section of the perforation with a major dimension in the longitudinal direction between the arcuate front surface and the rear surface at their bases substantially equal to the prescribed diameter of the perforation for engaging and driving the web in the longitudinal direction and a minor dimension in the lateral direction between the non-circular left side surface and the non-circular right side surface at their bases substantially less than the prescribed diameter of the perforation normally forming lateral gaps between the side surfaces and the edge of the perforation of minimize lateral tension on the web.

13. The tractor drive belt as defined in claim 12 wherein each of the non-circular side surfaces at their bases are bilaterally symmetrical with the minor dimension between the side surfaces being substantially less than the prescribed diameter of the perforations.

14. The tractor drive belt as defined in claim 13 wherein pins have oval cross-sections at their bases.

* * * * *